J. O. HEINZE, Jr.
ENGINE.
APPLICATION FILED JAN. 14, 1914.
1,220,335.
Patented Mar. 27, 1917.
2 SHEETS—SHEET 1.
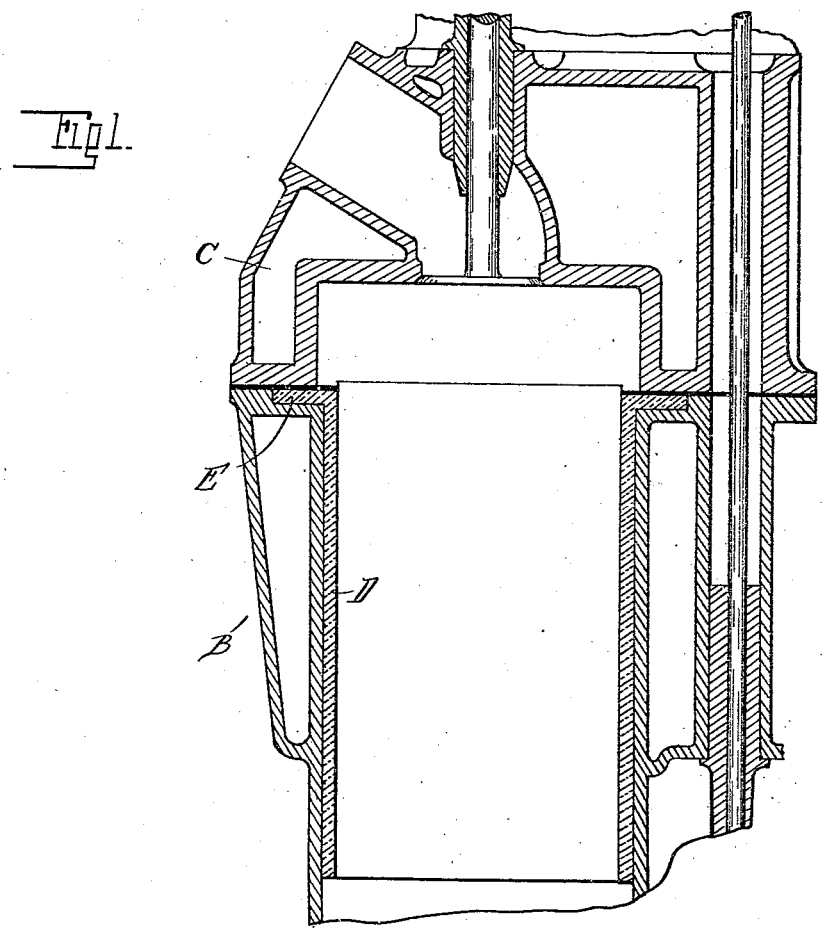
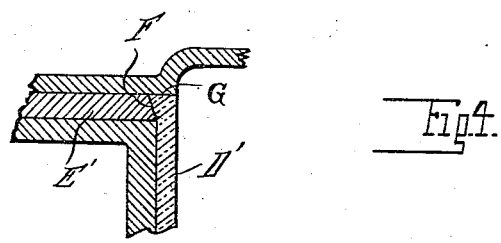
Witnesses
Inventor
John O. Heinze Jr.
By Whittemore Hulbert & Whittemore
Atty's J. O. HEINZE, Jr.
ENGINE.
APPLICATION FILED JAN. 14, 1914.
1,220,335.
Patented Mar. 27, 1917.
2 SHEETS—SHEET 2.
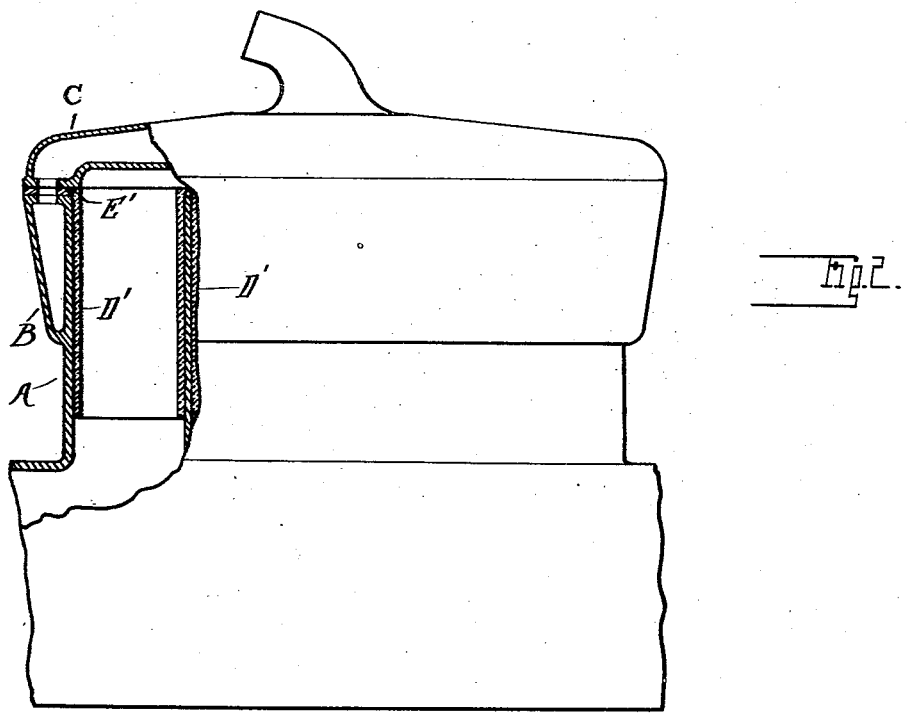
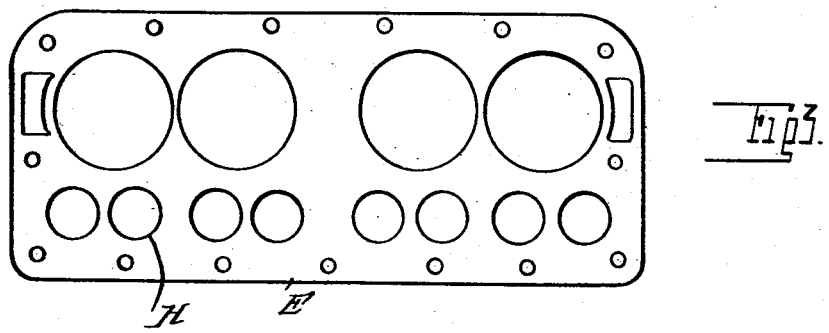

UNITED STATES PATENT OFFICE.

JOHN O. HEINZE, JR., OF DETROIT, MICHIGAN, ASSIGNOR TO GENERAL MOTORS COMPANY, OF DETROIT, MICHIGAN, A CORPORATION OF NEW JERSEY.

ENGINE.

1,220,335.  Specification of Letters Patent.  Patented Mar. 27, 1917.

Application filed January 14, 1914. Serial No. 811,993.

*To all whom it may concern:*

Be it known that I, JOHN O. HEINZE, Jr., a citizen of the United States of America, residing at Detroit, in the county of Wayne and State of Michigan, have invented certain new and useful Improvements in Engines, of which the following is a specification, reference being had therein to the accompanying drawings.

The invention relates to explosion engines, and has for its object, first, the lightening of the structure, and second, increasing the life and durability thereof.

In the present state of the art engine cylinders are usually formed of cast iron and have the water jacket formed integral therewith. Associated parts of the engine casing, such as the crank case, have been made of lighter material, as, for instance, aluminum, but this material has not sufficient strength or hardness for use in the cylinder construction, and furthermore the life of the engine is dependent upon the maintenance of the inner surface of the cylinder, and if this becomes worn or scored the whole casing becomes useless. Thus in multi-cylinder engines cast *en bloc* the destruction of the surface of one cylinder will render the whole engine useless.

With the present invention the structure is greatly lightened by forming the body of the cylinders, including the water jacket integral therewith, of a relatively light material such as aluminum, while the strength and durability of the structure is increased by providing a removable bushing or lining for each cylinder formed of a harder and stronger material, such as steel or cast iron. Other parts of the engine casing which are subjected to wear or impact may also be reinforced with the harder metal, and by making these parts removable, they may be replaced without destroying the utility of the main casing.

In the drawings:

Figure 1 is a longitudinal section through a portion of a single cylinder engine constructed in accordance with my invention;

Fig. 2 is a similar view through a multi-cylinder engine;

Fig. 3 is a plan view of the removable lining plate shown in Fig. 2; and

Fig. 4 is an enlarged section showing the connection between this lining plate and the cylinder bushings.

A is an engine casing having an integral water jacket B and formed of a light material, such as aluminum. C is a removable head for this cylinder also preferably formed of aluminum and provided with an integral water jacket. D is a bushing formed of harder material, such as steel or cast iron, and, as shown in Fig. 1, provided with an integral flange E extending laterally therefrom in the plane of the joint between the cylinder and head. This flange forms an anchor for the bushing which holds the same from longitudinal movement, but whenever it is necessary to remove or replace the bushing it is merely necessary to remove the head C and to withdraw the bushing from the cylinder.

As shown in Fig. 2, a plurality of cylinders cast *en bloc* are provided with individual bushings D' for each cylinder, and a common plate E' also formed of steel or other harder material is arranged between the head and the cylinders. This plate is preferably attached to the cylinder bushings so as to form an anchor for the latter, and, as shown in Fig. 4, each bushing is formed with a slightly inclined or flaring head F which engages a correspondingly-shaped seat in the plate E'. Thus any downward movement of the bushing is prevented by this engagement with the plate, while any upward movement is prevented by the head C which abuts against the end of the bushing, as shown at G. The plate E' also forms a seat member for the valves, as indicated at H.

With the construction as described, the bulk of the material used for the engine casing is the aluminum or other light material, while the bushings for the cylinders and facings for the valve seats, which are formed of the harder material, will impart the required strength and durability. If, however, one of these bushings or valve seats becomes worn or injured in any way, it is a simple matter to remove and replace it.

What I claim as my invention is:—

1. In an engine, a casing comprising a plurality of cylinders cast *en bloc* from a relatively light material, such as aluminum, a bushing for each of said cylinders formed of a harder material, a detachable head for said cylinders, and a plate of a harder material arranged between said cylinders and detachable head, forming an anchoring means for said bushing and a seat for the valves.

2. In an engine, the combination with a plurality of cylinders cast *en bloc* from a relatively light material, such as aluminum, of a bushing for each of said cylinders formed of a harder material, such as steel, a detachable head for said cylinders, and a facing plate of the harder material arranged between said cylinders and cap or head and forming the valve seats.

3. In an engine, the combination of a plurality of cylinders cast *en bloc* from a relatively light material, such as aluminum, and including a water jacket and a portion of the crank case, a bushing for each of said cylinders formed of a harder material, such as steel, a water jacketed head for said cylinders formed of the same light material and detachably secured thereto, and a facing plate of the harder material arranged between said head and the cylinders and forming the valve seats.

4. In an engine, the combination with a plurality of cylinders, cast from a relatively light material, of a bushing for each of said cylinders formed of a harder material, a detachable head for said cylinders, and a facing plate of the harder material arranged between said cylinders and head and forming valve seats.

5. In an engine, the combination with a cylinder and an integral water jacket formed of a relatively light material such as aluminum, a bushing for said cylinder formed of a harder material and a valve seat also formed of the harder material and secured in position with reference to the bushing by the portion of the engine formed of the lighter material.

In testimony whereof I affix my signature in presence of two witnesses.

JOHN O. HEINZE, Jr.

Witnesses:
WM. J. BELKNAP,
JAMES P. BARRY.